United States Patent
Buter et al.

(10) Patent No.: US 6,562,899 B2
(45) Date of Patent: May 13, 2003

(54) BRANCHED HYDROXYL-FUNCTIONAL POLYESTER RESIN AND ITS USE IN AQUEOUS CROSS-LINKABLE BINDER COMPOSITIONS

(75) Inventors: Roelof Buter, Dieren (NL); André Steenbergen, Arnhem (NL); Taco Scherer, Haarlem (NL); Petrus Johannes Arnoldus Geurink, Voorhout (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/839,063

(22) Filed: Apr. 20, 2001

(65) Prior Publication Data
US 2002/0013404 A1 Jan. 31, 2002

(30) Foreign Application Priority Data
Apr. 20, 2000 (EP) .............................. 00201423

(51) Int. Cl.$^7$ .................. C08L 75/06; C08G 63/181; C08G 63/688
(52) U.S. Cl. .................. 524/591; 524/845; 528/295; 528/300; 528/302
(58) Field of Search ................ 524/591, 845; 528/295, 300, 302

(56) References Cited

U.S. PATENT DOCUMENTS 5,344,873 A  9/1994  Blum

FOREIGN PATENT DOCUMENTS

| EP | 0 583 728 A1 | 2/1994 |
| GB | 2 097 005 A | 10/1982 |
| WO | WO 94/28043 | 12/1994 |

OTHER PUBLICATIONS

Derwent Absrract No.: 009778804 abstracting EP 0 583 728 A1, Feb. 1994.

Primary Examiner—Tae H. Yoon
(74) Attorney, Agent, or Firm—Joan M. McGillycuddy

(57) ABSTRACT

Branched hydroxyl-functional polyester resin having an average hydroxyl functionality of >2, a hydroxyl number of 25 to 300 mg KOH/g, and a number average molecular weight within the range of from 500 to 3,000, which polyester resin comprises polyalkylene oxide groups and, optionally, sulphonate groups, wherein the polyester resin comprises the reaction product of 1) a mixture of carboxylic acids comprising
   50 to 80 mole % of an m- and/or p-aromatic and/or cycloaliphatic dicarboxylic acid,
   20 to 50 mole % of an aliphatic dicarboxylic acid and/or aliphatic monocarboxylic acid with more than 6 carbon atoms, and, optionally, a tri- or higher-functional acid, and
2) a mixture of alcohols comprising
   an aliphatic diol with at least 4 carbon atoms and/or a cycloaliphatic diol with at least 4 carbon atoms, a $C_1$–$C_4$ alkoxy polyalkylene oxide glycol and/or $C_1$–$C_4$ alkoxy polyalkylene oxide 1,3-diol having a number average molecular weight of 500 to 3,000, and, optionally, a tri- or higher-functional polyalcohol, wherein the polyester resin has a carboxylic acid number of ≦20 mg KOH/g (≦0.357 meq COOH groups per g of resin) and, optionally, a sulphonate number of ≦4 mg KOH/g (≦0.070 meq sulphonate groups per g of resin), the acid groups being at least partly neutralised.

14 Claims, No Drawings

BRANCHED HYDROXYL-FUNCTIONAL POLYESTER RESIN AND ITS USE IN AQUEOUS CROSS-LINKABLE BINDER COMPOSITIONS

CONTINUING DATA

This application claims priority of European Patent Application No. 00201423.1 filed on Apr. 20, 2000.

FIELD OF THE INVENTION

The invention relates to a branched hydroxyl-functional polyester resin having an average hydroxyl functionality of >2, a hydroxyl number of 25 to 300 mg KOH/g, and a number average molecular weight within the range of from 500 to 3,000, which polyester resin comprises polyalkylene oxide groups and, optionally, sulphonate groups.

BACKGROUND OF THE INVENTION

Polyester resins and their use in two-component aqueous-based coating compositions are known from, int. al., EP-A-0 537 568 and WO 94/28043. The water-dilutable polyesters disclosed therein contain both sulphonate and hydroxyl groups. Though high-quality coating layers can be obtained with the known aqueous-based coating compositions, the solids content of the aqueous polyester dispersions used in the known compositions is too low to be competitive in a great many applications, such as coating compositions to be used in automotive refinishing shops. The concentration of the polyester particles in the examples of both prior art publications does not exceed 35 wt. %. Furthermore, the storage stability of the aqueous polyester dispersions is inferior. Moreover, in order to emulsify the hydrophobic polyisocyanates in EP-A-0 537 568, frequently use has to be made of an external emulsifier, whereas in the examples of WO 94/28043 always use is made of polyisocyanate modified with polyethylene oxide glycol.

A disadvantage of high water content is that the elimination of said water after the composition has been formed into, int. al., a coating layer requires a lot of time and energy. A further disadvantage of the known coating compositions is that the binder compositions exemplified in WO 94/28043 are said to have a gel time of 3 to 6 hours, whereas on the other hand the curing speed of the binder compositions exemplified in WO 94/28043 is rather low (>12 hrs at 50° C.).

SUMMARY OF THE INVENTION

The invention now provides a branched hydroxyl-functional polyester resin having an average hydroxyl functionality of >2, a hydroxyl number of 25 to 300 mg KOH/g, and a number average molecular weight within the range of from 500 to 3,000, which polyester resin comprises polyalkylene oxide groups and, optionally, sulphonate groups, characterised in that the polyester resin comprises the reaction product of 1) a mixture of carboxylic acids comprising
   50 to 80 mole % of an m- and/or p-aromatic and/or cycloaliphatic dicarboxylic acid,
   20 to 50 mole % of an aliphatic dicarboxylic acid and/or aliphatic monocarboxylic acid with more than 6 carbon atoms, and, optionally, a tri- or higher-functional acid, and
2) a mixture of alcohols comprising
   an aliphatic diol with at least 4 carbon atoms and/or a cycloaliphatic diol with at least 4 carbon atoms, a $C_1$–$C_4$ alkoxy polyalkylene oxide glycol and/or $C_1$–$C_4$ alkoxy polyalkylene oxide 1,3-diol having a number average molecular weight of 500 to 3,000, and, optionally, a tri- or higher-functional polyalcohol, wherein the polyester resin has a carboxylic acid number of ≦20 mg KOH/g (≦0.357 meq COOH groups per g of resin) and, optionally, a sulphonate number of ≦4 mg KOH/g (≦0.070 meq sulphonate groups per g of resin), the acid groups being at least partly neutralised.

DETAILED DESCRIPTION OF THE INVENTION

Also provided according to the invention is an aqueous dispersion comprising the branched hydroxyl-functional polyester resin and an aqueous cross-linkable binder composition comprising the branched hydroxyl-functional polyester resin and a organic hydrophobic polyisocyanate. Further provided according to the invention is the use of the aqueous cross-linkable binder composition in coating compositions, lacquer compositions, and adhesives. Finally, the present invention provides the use of such aqueous coating compositions in car refinish applications.

The storage stability of the branched hydroxyl-functional polyester resin according to the invention is excellent. Aqueous dispersions comprising the branched hydroxyl-functional polyester resin may have a solids content of more than 45 wt. % at a viscosity of up to 5 Pa·s. The branched hydroxyl-functional polyester resin is able to disperse organic hydrophobic polyisocyanates in the absence of external emulsifiers. Aqueous cross-linkable binder compositions comprising a branched hydroxyl-functional polyester resin and an organic hydrophobic polyisocyanate have an acceptable pot life and cure speed. Aqueous coating compositions comprising the aqueous cross-linkable binder composition according to the present invention provide coatings having excellent properties like gloss, hardness, and distinctness of image (DOI).

The branched hydroxyl-functional polyester resin can be prepared using conventional polymerisation procedures known to be effective for polyester resin synthesis. The reaction to form the polyester resin may be conducted in one or more stages. In order to obtain a branched polyester resin, the condensation reaction is carried out in the presence of a branching agent, which may be a tri- or higher-functional acid and/or alcohol. For the tri- or higher-functional acid preference is given to an acid selected from the group of trimellitic acid and pyromellitic acid or the anhydride thereof. For the tri- or higher-functional polyalcohol preference is given to a polyalcohol selected from the group of 1,1,1-trimethylol propane, 1,1,1-trimethylol ethane, 1,2,3-trimethylol propane, pentaerythritol, and mixtures thereof. More preferred is the use of a tri- or higher-functional polyalcohol. Most preferred is the use of 1,1,1-trimethylol propane.

If desired, the polyester resin may contain a proportion of carbonylamino linking groups —C(=O)—NH— (i.e. amide linking group) by including an appropriate amino-functional reactant as part of the "hydroxyl component" (such amide linkages are in fact useful in that they are more hydrolysis-resistant and more hydrophilic.)

In order to achieve hydroxyl functionality in the resulting polyester resin, a stoichiometric excess of the hydroxyl component should be used. Furthermore, in order to achieve an average hydroxyl functionality of >2, preferably ≧2.3, more preferably ≧2.5, the polyester resin must have a branched structure.

The mixture of carboxylic acids may comprise m-aromatic dicarboxylic acids, p-aromatic dicarboxylic acids, cycloaliphatic dicarboxylic acids, aliphatic dicarboxylic acids with more than 6 carbon atoms, and aliphatic monocarboxylic acid with more than 6 carbon atoms.

Suitable dicarboxylic acids for obtaining excellent hydrolytic stability as well as excellent mechanical properties are m-aromatic dicarboxylic acids such as isophthalic acid, p-aromatic dicarboxylic acids such as terephthalic acid and dimethyl terephthalate, and cycloaliphatic dicarboxylic acids such as 1,4-cyclohexane dicarboxylic acid and hexahydrophthalic anhydride. Mixtures of these dicarboxylic acids may also be used.

Suitable aliphatic dicarboxylic acids with more than 6 carbon atoms include azelaic acid and sebacic acid. Suitable aliphatic monocarboxylic acids with more than 6 carbon atoms include isononanoic acid, decanoic acid, 2-ethylhexyl carboxylic acid, and dodecanoic acid. Mixtures of these aliphatic dicarboxylic acids and/or aliphatic monocarboxylic acids may also be used.

Furthermore, the mixture of carboxylic acids may contain a small amount of an alkali salt of a sulphonic acid-substituted mono- or dicarboxylic acid or ester. Preferably, an alkali salt of a sulphonic acid-substituted dicarboxylic acid or ester is used, such as sodium sulphosuccinic acid and 5-(sodium sulpho)isophthalic acid.

The mixture of alcohols may comprise aliphatic diols with at least 4 carbon, atoms, cycloaliphatic diols with at least 4 carbon atoms, $C_1$–$C_4$ alkoxy polyalkylene oxide glycols and/or $C_1$–$C_4$ alkoxy polyalkylene oxide 1,3-diols having a number average molecular weight of 500 to 3,000.

Suitable (cyclo)aliphatic diols for the preparation of the hydroxyl-functional polyester resin are diols having at least 4 carbon atoms such as 1,4-butane diol, 1,6-hexane diol, 2,2-dimethyl-1,3-propane diol, 2-ethyl-2-propyl-1,3-propane diol, 1,2-, 1,3-, and 1,4-cyclohexane diols, the corresponding cyclohexane dimethanol, and mixtures thereof.

In order to incorporate a hydrophobic organic polyisocyanate into the aqueous polyester resin dispersion without the use of external emulsifiers, the polyester resin should comprise a $C_1$–$C_4$ alkoxy polyalkylene oxide group. The preferred alkylene oxide groups are ethylene oxide groups, but alternatively propylene oxide groups or mixtures of ethylene oxide and propylene oxide groups are useful as well. For example, the alkylene oxide groups may be $C_1$–$C_4$ alkoxy ethers of polyalkylene glycols with the structure:

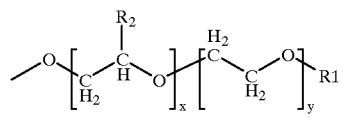

wherein R1 is a hydrocarbon radical with 1 to 4, preferably 1 or 2, carbon atoms; R2 is a methyl group; x is between 0 and 40, preferably between 0 and 20, most preferably between 0 and 10; y is between 0 and 50, and x+y is between 2 and 50, preferably between 2 and 25. The distribution of the alkylene glycols may be at random, alternating distribution or blocked. Examples are $C_1$–$C_4$ alkoxy poly$C_2$($C_3$) alkylene oxide glycol and/or $C_1$–$C_4$ alkoxy poly$C_2$($C_3$) alkylene oxide 1,3-diol, wherein poly$C_2$($C_3$)alkylene oxide stands for polyethylene oxide, optionally comprising propylene oxide units. Preferably the polyester resin comprises 2.5 to 15 wt. % $C_1$–$C_4$ alkoxy polyalkylene oxide groups with a number average molecular weight of 500 to 3,000, preferably between 500 and 1,500, most preferably between 500 and 1,250, while preference is given to a polyester resin comprising 5 to 10 wt. % of $C_1$–$C_4$ alkoxy polyalkylene oxide groups. Optimum result are obtained with a polyester resin wherein the polyalkylene oxide units are polyethylene oxide units.

Suitable $C_1$–$C_4$ alkoxy polyalkylene oxide compounds contain at least one hydroxyl group. Examples are methoxy poly$C_2$($C_3$)alkylene oxide glycols and methoxy poly$C_2$($C_3$) alkylene oxide-1,3-diols, such as Tegomer® D-3123 (PO/EO=15/85; Mn=1,180), Tegomer® D-3409 (PO/EO=0/100; Mn=2,240), and Tegomer® D-3403 (PO/EO=0/100; Mn=1, 180) available from Goldschmidt AG, Germany, and MPEG 750 and MPEG 1000.

Optionally, monoalcohols may be used in the preparation of the polyester resin. Examples of mono-alcohols include n-hexanol, 2-ethyl hexanol, cyclohexanol, tert.butyl cyclohexanol, stearyl alcohol, dodecanol, and mixtures thereof.

The polyester resin has a carboxylic acid number of ≦20 mg KOH/g (≦0.357 meq COOH groups per g of resin). Preferably, the polyester resin has a carboxylic acid number of 5 to 15 mg KOH/g (0.089 to 0.268 meq COOH groups per g of resin). Optionally, the polyester resin may have a sulphonate number of ≦4 mg KOH/g (≦0.070 meq sulphonate groups per g of resin). Preferably, the polyester resin has a sulphonate number of 0.5 to 4 mg KOH/g (0.009 to 0.070 meq sulphonate groups per g of resin), more preferably 1 to 3 mg KOH/g (0.0175 to 0.0525 meq sulphonate groups per g of resin). Alternatively, the polyester resin has a carboxylic acid number of less than 10 mg KOH/g (less than 0.178 meq COOH groups per g of resin), preferably between 5 and 9 mg KOH/g (0.089 to 0.161 meq COOH groups per g of resin), and a sulphonate number of at least 0.5 mg KOH/g (at least 0.009 meq sulphonate groups), preferably 1 to 3 mg KOH/g (0.0175 to 0.0525 meq sulphonate groups per g of resin).

The polyester resin has a hydroxyl number of 25 to 300 mg KOH/g, preferably 50 to 250 mg KOH/g, more preferably 100 to 220 mg KOH/g. The polyester resin has a number average molecular weight within the range of from 500 to 3,000, preferably 750 to 2,500, more preferably 1,000 to 2,000.

At the end of the polycondensation reaction the carboxylic acid groups of the polyester resin are at least partially neutralised with a neutralising agent, after which water is added, preferably to the hot melt at a temperature starting at 100 to 110° C., after which the temperature is gradually lowered to ambient temperature.

The aqueous polyester resin dispersion obtained in this manner may have a solids content of more than 45 wt. %, preferably 45 to 65 wt. %, more preferably 50 to 60 wt. %, at a viscosity of up to 5 Pa·s, preferably 0.1 to 3 Pa·s. The average particle size of the thus obtained dispersion is in the range of 30 to 300 nm, and preferably in the range of 50 to 200 nm. The thus obtained dispersion has a pH between 6 and 9, preferably between 6.5 and 8.

Examples of neutralising agents include alkali metal hydroxides, such as sodium hydroxide, potassium hydroxide, or lithium hydroxide, ammonia, and amines. Suitable amines include primary, secondary, and tertiary amines. Suitable primary amines are, for example, isopropyl amine, butyl amine, ethanol amine, 3-amino-1-propanol, 1-amino-2-propanol, 2-amino-2-methyl-1-propanol or 2-amino-2-methyl-1,3-propane diol. Secondary amines that can be used are, for example, morpholine, diethyl amine, dibutyl amine, N-methyl ethanol amine, diethanol amine, or diisopropanol amine. Examples of suitable tertiary amines include trimethyl amine, triethyl amine, triisopropyl amine, triisopropanol amine, N,N-dimethyl ethanol amine, dimethyl isopropyl amine, N,N-diethyl ethanol amine, 1-dimethyl amino-2-propanol, 3-dimethyl amino-1-propanol, 2-dimethyl amino-2-methyl-1-propanol, N-methyl diethanol amine, N-ethyl diethanol amine, N-butyl diethanol amine, N-ethyl morpholine. Tertiary amines are preferred. More preferred is N,N-dimethyl ethanol amine.

The invention relates also to an aqueous cross-linkable binder composition comprising
A) at least one branched hydroxyl-functional polyester resin and
B) at least one organic hydrophobic polyisocyanate.

The organic hydrophobic polyisocyanate (component B) includes polyfunctional, preferably free polyisocyanates with an average NCO functionality of more than 2, preferably 2.5 to 5, and may be (cyclo)aliphatic, araliphatic or aromatic in nature. Preferably, the hydrophobic organic polyisocyanate has a viscosity at 22° C. of 0.1 to 5 Pa·s. Examples of hydrophobic organic polyisocyanates include 1,6-diisocyanatohexane, isophorone diisocyanate, 2,4-toluene diisocyanate, 2,6-toluene diisocyanate, diphenyl methane-diisocyanate, 4,4'-bis(isocyanato-cyclohexyl) methane, 1,4-diisocyanatobutane, 1,5-diisocyanato-2,2-dimethyl pentane, 2,2,4-trimethyl-1,6-diisocyanatohexane, 1,10-diisocyanatodecane, 4,4-diisocyanato-cyclohexane, 2,4-hexahydrotoluene diisocyanate, 2,6-hexahydrotoluene diisocyanate, norbornane diisocyanate, 1,3-xylylene diisocyanate, 1,4-xylylene diisocyanate, 1-isocyanato-3-(isocyanato methyl)-1-methyl cyclohexane, m-α,α-α',α'-tetramethyl xylylene diisocyanate, and mixtures thereof. The hydrophobic polyisocyanate may include biuret, urethane, uretdione, and isocyanurate derivatives of the above-mentioned compounds. Normally, these products are liquid at ambient temperature and commercially available in a wide range. Particularly preferred isocyanate curing agents are triisocyanates and adducts. Examples thereof are 1,8-diisocyanato-4-(isocyanatomethyl)octane, the adduct of 3 moles of toluene diisocyanate to 1 mole of trimethylol propane, the isocyanurate trimer of 1,6-diisocyanatohexane, the isocyanurate trimer of isophorone diisocyanate, the uretdione dimer of 1,6-diisocyanatohexane, the biuret trimer of 1,6-diisocyanatohexane, the adduct of 3 moles of m-α-α,α',α'-tetramethyl xylene diisocyanate to 1 mole of trimethylol propane, and mixtures thereof. More preferred are the isocyanurates and uretdiones of 1,6-hexane diisocyanate and isophorone diisocyanate. Usually these compounds contain small quantities of their higher homologues.

Optionally, the aqueous cross-linkable binder composition may also comprise an organic hydrophilic polyisocyanate compound substituted with non-ionic groups, such as the above-mentioned $C_1$–$C_4$ alkoxy polyalkylene oxide groups. Preferably, 30 wt. % of non-ionic groups may be present on total solid polyisocyanate compound, i.e. organic hydrophobic and hydrophilic polyisocyanate, more preferably 20 wt. %, most preferred 15 wt. %. Preferred are the isocyanurates of 1,6-hexane diisocyanate and isophorone diisocyanate substituted with methoxy polyethylene glycol.

The polyisocyanate and the aqueous polyester resin dispersion should be mixed in such a ratio that the NCO:OH ratio is in the range of 0.5–3:1, preferably 0.75–2.5:1, and more preferably 1–2:1.

The organic hydrophobic polyisocyanate compound B) and, optionally, the organic hydrophilic polyisocyanate may be mixed into component A) by any suitable technique. However, simply stirring is usually sufficient. Sometimes it may be useful to dilute the polyisocyanate somewhat with an organic solvent like butyl acetate or 1-methoxy-2-propyl acetate to reduce the viscosity of the polyisocyanate.

The binder composition may contain catalysts like amines and Sn-based catalysts, such as dibutyl tin dilaurate and dibutyl tin acetate. The pot life at ambient temperature usually is between 4 and 12 hours, depending on the use of the catalysts and their amount.

The coating compositions may further comprise other ingredients, additives or auxiliaries, such as other polymers or polymer dispersions, pigments, dyes, emulsifiers (surfactants), pigment dispersion aids, wetting agents, levelling agents, anti-cratering agents, antifoaming agents, anti-sagging agents, heat stabilisers, UV absorbers, antioxidants, and fillers.

Suitable types of other polymer dispersions include acrylic polymer emulsions and aqueous polyurethane dispersions.

Also included in the binder or coating compositions of the invention may be reactive diluents such as water-soluble mono- or (preferably) polyhydric alcohols. Examples of monohydric alcohols include hexyl glycol, butoxyethanol, 1-methoxy-propanol-2, 1-ethoxy-propanol-2, 1-propoxy-propanol-2, 1-butoxy-propanol-2, 2-methoxybutanol, 1-isobutoxy-propanol-2, dipropylene glycol monomethyl ether, diacetone alcohol, methanol, ethanol, propanol, isopropanol, butanol, 2-butanol, pentanol, hexanol, benzyl alcohol, and mixtures thereof. Examples of polyhydric alcohols include ethylene glycol, diethylene glycol, propylene glycol, isomeric butane diols, the polyethylene oxide glycols or polypropylene oxide glycols, 1,1,1-trimethylol propane, 1,2,3-trimethylol propane, pentaerythritol, glycerol, and mixtures thereof.

The composition of the present invention consists essentially of water, being an aqueous composition. However, about 20 wt. % of liquid content of the composition may be an organic solvent. As suitable organic solvents may be mentioned dimethyl dipropylene glycol, methyl ether of diacetone alcohol, ethyl acetate, butyl acetate, ethyl glycol acetate, butyl glycol acetate, 1-methoxy-2-propyl acetate, butyl propionate, ethoxy ethyl propionate, toluene, xylene; methylethyl ketone, methyl isobutyl ketone, methyl amyl ketone, ethyl amyl ketone, dioxolane, N-methyl-2-pyrrolidone, dimethyl carbonate, propylene carbonate, butyrolactone, caprolactone, and mixtures thereof. The VOC of the composition may range from 0 to 400 g/l, preferably from 0 to 250 g/l.

The coating composition of the present invention may be applied to any substrate. The substrate may be, for example, metal, plastic, wood, glass, ceramic, or some other coating layer. The other coating layer may be comprised of the coating composition of the current invention or it may be a different coating composition. The coating compositions of the current invention show particular utility as clear coats, base coats, pigmented top coats, primers, and fillers. The coating compositions can be applied by conventional means such as by spray gun, brush, or roller, spraying being preferred. Curing temperatures preferably are between 0 and 80° C. and more preferably between 10 and 60° C. The compositions are particularly suitable in the preparation of coated metal substrates, such as in the refinish industry, in particular the body shop, to repair automobiles and transportation vehicles, and in finishing large transportation vehicles such as trains, trucks, buses, and aeroplanes.

Preferred is the use of the coating composition of the present invention as a clear coat. Clear coats are required to be highly transparent and must adhere well to the base coat layer. It is further required that the clear coat does not change the aesthetic aspect of the base coat by strike-in, i.e. discolouration of the base coat due to its solvation by the clear coat composition, or by yellowing of the clear coat upon outdoor exposure. A clear coat based on the coating composition of the present invention does not have these drawbacks.

In the case of the coating composition being a clear coat, the base coat may be a conventional base coat known in the coating art. Examples are solvent borne base coats, e.g., Autobase® ex Akzo Nobel Coatings BV, based on cellulose acetobutyrate and acrylic resins, and water borne base coats, e.g., Autowave® ex Akzo Nobel Coatings BV, based on an acrylic resin dispersion. Furthermore, the base coat may comprise pigments (colour pigments, metallics and/or pearls), wax, solvents, flow additives, neutralising agent, and defoamers. Also high solids base coats can be used. These are, for instance, based on polyols, imines, and isocyanates. The clear coat composition is applied to the surface of a base coat and then cured. An intermediate curing step for the base coat may be introduced.

The invention will be illustrated with reference to the following examples. Of course these examples are submitted for a better understanding of the invention only; they are not to be construed as limiting in any manner the scope thereof.

EXAMPLES

In the following examples, the preparation of a number of water borne polyester resin dispersions and binder compositions according to the invention is disclosed. The properties measured on these dispersions are listed in Table 1. The dispersions' average particle size given in this table was determined with the aid of dynamic light scattering, with the dispersions diluted to a solids content of about 0.1 wt. %. The viscosity was determined with a Brookfield viscometer (LV-4; 60 revolutions per minute). The solids content was determined in accordance with ASTM method no. 1644-59, with heating to 140° C. over a period of 30 minutes. The Mn was measured with GPC with polystyrene as standard.

Preparation of Branched Water Borne Polyester Resin Dispersions

Example 1

Preparation of the Branched Polyester Resin

A 3 l flask fitted with a stirrer, a thermometer, a reflux condenser, and a nitrogen inlet was charged with a mixture composed of:

597.6 g of sebacic acid
398.4 g of isophthalic acid
426.2 g of 1,4-cyclohexane dimethylol
314.5 g of 2,2-dimethyl-1,3-propane diol
246.6 g of 1,1,1-trimethylol propane
0.25 g of Fascat 4100 (Sn-based catalyst)

After deaeration, the flask was brought under a nitrogen atmosphere. The contents of the flask were heated to 150° C., whereupon the temperature was gradually increased to 200° C. over a period of 2 hours. The temperature of 200° C. was maintained in the flask until a clear reaction melt was obtained. After the collection of 171 ml water of distillation, a clear reaction mixture was obtained. The mixture was cooled to 140° C., after which the following components were added:

172.6 g of isophthalic acid and
180 9 of methoxy polyethylene oxide glycol (Mn=750).

The reaction mixture was gradually heated to 210° C. and kept at this temperature until an acid value of 14.9 mg KOH/g was obtained.

The practical OH-value was 139.0 mg KOH/g, the OH-functionality was 3.0, and the Mn=1,376.

Example 1a

Preparation of a Dispersion From the Branched Polyester Resin of Example 1

A 2 l flask fitted with a stirrer, a thermometer, a reflux condenser, and a dropping funnel was filled with 500 g of the polyester resin of Example 1.

The contents of the flask were heated to 110C, at which temperature there were added:

9.5 g of N,N-dimethyl ethanol amine (corresponding to a neutralisation degree (N.R.) of the carboxylic groups of 80%) and subsequently, over a period of 3 hours: 433.9 g of demineralised water, after which the temperature was gradually decreased from 100° C. to 30° C.

The properties of the thus obtained water borne polyester resin dispersion are given in Table 1.

Example 1b —Preparation of a Dispersion From the Branched Polyester Resin of Example 1

In a manner analogous to that disclosed in Example 1a, a dispersion was prepared, with the proviso that this time the following ingredients were added to the flask containing 500 g of the polyester resin of Example 1:

8.9 g of N,N-dimethyl ethanol amine and 383.9 g of demineralised water.

The properties of the thus obtained water borne polyester resin dispersion are given in Table 1.

Example 2

In a manner analogous to that disclosed in Example 1, a polyester resin was prepared, with the proviso that this time the flask was charged with:

597.6 g of sebacic acid
398.4 g of isophthalic acid
426.2 g of 1,4-cyclohexane dimethylol
253.3 g of 2,2-dimethyl-1,3-propane diol
321.6 g of 1,1,1-trimethylol propane
0.25 g of Fascat 4100

After a clear reaction mixture had been obtained, there were added:

185.9 g of isophthalic acid and
180 g of methoxy polyethylene oxide glycol (Mn=750).

The end product had an acid number of 13.0 mg KOH/g, a practical OH-value of 147, an OH-functionality of 3.25, and a Mn of 1,487.

Example 2a

Example 1a was repeated, with the proviso that the flask was charged with:

500 g of the polyester resin of Example 2, after which there were added 8.3 g of N,N-dimethyl ethanol amine and 472.1 g of demineralised water.

The properties of the thus obtained water borne polyester resin dispersion are given in Table 1.

Example 2b

In a manner analogous to that disclosed in Example 2a, a dispersion was prepared, with the proviso that this time the following ingredients were added to the flask containing 500 g of the polyester resin of Example 2:

7.25 g of N,N-dimethyl ethanol amine and 370 g of demineralised water.

The properties of the thus obtained water borne polyester resin dispersion are given in Table 1.

Example 3

In a manner analogous to that disclosed in Example 1, a polyester resin was prepared, with the proviso that this time the flask was charged with:

409.0 g of sebacic acid
237.0 g of isononanoic acid
503.0 g of isophthalic acid
399.6 g of 1,4-cyclohexane dimethylol
82.0 g of 2,2-dimethyl-1,3-propane diol
496.5 g of 1,1,1-trimethylol propane
0.25 g of Fascat 4100

After a clear reaction mixture had been obtained, there were added:

161.8 g of isophthalic acid and
191.3 g of methoxy polyethylene oxide glycol (Mn=750).

The end product had an acid number of 14.0 mg KOH/g, a practical OH-value of 136, an OH-functionality of 3, and a Mn of 1,370.

Example 3a

Example 1a was repeated, with the proviso that the flask was charged with:

500 g of the polyester resin of Example 3, after which there were added 8.35 g of N,N-dimethyl ethanol amine and 462.5 g of demineralised water.

The properties of the thus obtained water borne polyester resin dispersion are given in Table 1.

Example 3b

In a manner analogous to that disclosed in Example 3a, a dispersion was prepared, with the proviso that this time the following ingredients were added to the flask containing 500 g of the polyester resin of Example 3:

7.2 g of N,N-dimethyl ethanol amine and 377.8 g of demineralised water.

The properties of the thus obtained water borne polyester resin dispersion are given in Table 1.

Example 4

In a manner analogous to that disclosed in Example 1, a polyester resin was prepared, with the proviso that this time the flask was charged with:

348.5 g of sebacic acid
237.0 g of isononanoic acid
552.8 g of isophthalic acid
399.6 g of 1,4-cyclohexane dimethylol
82.0 g of 2,2-dimethyl-1,3-propane diol
496.5 g of 1,1,1-trimethylol propane
0.25 g of Fascat 4100

After a clear reaction mixture had been obtained, there were added:

161.8 g of isophthalic acid and
191.3 of methoxy polyethylene oxide glycol (Mn=750).

The end product had an acid number of 13.5 mg KOH/g, a practical OH-value of 136, an OH-functionality of 3, and a Mn of 1,381.

Example 4a

Example 1a was repeated, with the proviso that the flask was charged with:

500 g of the polyester resin of Example 4, after which there were added 6.45 g of N,N-dimethyl ethanol amine and 370.7 g of demineralised water.

The properties of the thus obtained water borne polyester resin dispersion are given in Table 1.

Example 5

In a manner analogous to that disclosed in Example 1, a polyester resin was prepared, with the proviso that this time the flask was charged with:

597.6 g of sebacic acid
398.4 9 of isophthalic acid
569.1 g of 2,2-dimethyl-1,3-propane diol
321.6 g of 1,1,1-trimethylol propane
0.25 g of Fascat 4100

After a clear reaction mixture had been obtained, there were added:

199.2 g of isophthalic acid and
168 g of methoxy polyethylene oxide glycol (Mn=750).

The end product had an acid number of 14.6 mg KOH/g, a practical OH-value of 151, an OH-functionality of 3.5, and a Mn of 1,443.

Example 5a

Example 1a was repeated, with the proviso that the flask was charged with:

500 g of the polyester resin of Example 5, after which there were added 8.1 9 of N,N-dimethyl ethanol amine and 417.8 g of demineralised water.

The properties of the thus obtained water borne polyester resin dispersion are given in Table 1.

Example 6

In a manner analogous to that disclosed in Example 1, a polyester resin was prepared, with the proviso that this time the flask was charged with:

348.4 g of sebacic acid
237.0 g of isononanoic acid
550.4 g of isophthalic acid
376.7 g of 2,2-dimethyl-1,3-propane diol
504.5 g of 1,1,1-trimethylol propane
0.25 g of Fascat 4100

After a clear reaction mixture had been obtained, there were added:

186.7 g of isophthalic acid and
180 g of methoxy polyethylene oxide glycol (Mn=750).

The end product had an acid number of 13.3 mg KOH/g, a practical OH-value of 135, an OH-functionality of 3.5, and a Mn of 1,352.

Example 6a

Example 1a was repeated, with the proviso that the flask was charged with:
500 g of the polyester resin of Example 6, after which there were added 6.9 g of N,N-dimethyl ethanol amine and 402.2 g of demineralised water.

The properties of the thus obtained water borne polyester resin dispersion are given in Table 1.

Example 7

In a manner analogous to that disclosed in Example 1, a polyester resin was prepared, with the proviso that this time the flask was charged with:
21.4 g of 5-(sodium sulpho)isophthalic acid
192.6 g of isophthalic acid
426.2 g of 1,4-cyclohexane dimethylol
253.4 g of 2,2-dimethyl-1,3-propane diol
321.6 g of 1,1,1-trimethylol propane
25.0 g of demineralised water
0.25 g of Fascat 4100

The homogenised mixture was gradually heated to 180° C. and kept at this temperature until a clear mixture had been obtained. After 62 ml water of distillation had been collected, the clear reaction mixture was cooled to 140° C.

At this temperature there were added:
597.9 g of sebacic acid and
192.5 g of isophthalic acid.

After the temperature of the reaction mixture had been gradually increased to 195° C., the mixture was kept at this temperature until 201 ml water of distillation had been collected and a clear reaction melt obtained. After the reaction mixture had been cooled to 140° C., the following components were added:
172.6 g of isophthalic acid and
180.0 g of methoxy polyethylene oxide glycol (Mn=750).

The reaction mixture was gradually heated to 215° C. and kept at said temperature until an acid value of 6.7 mg KOH/g was obtained.

The practical OH-value was 144, the OH-functionality was 3.25, and the molecular weight Mn=1,593.

Example 7a

Example 1a was repeated, with the proviso that the flask was charged with:
500 g of the polyester resin of Example 7, after which there were added 3.2 g of N,N-dimethyl ethanol amine and 496.8 g of demineralised water.

The properties of the thus obtained water borne polyester resin dispersion are given in Table 1.

Example 7b

Example 7a was repeated, except that this time:
1.6 g of N,N-dimethyl ethanol amine and 424.3 g of demineralised water were added.

The properties of the obtained polyester resin dispersion are given in Table 1.

Example 8

In a manner analogous to that disclosed in Example 7, a polyester resin was prepared, with the proviso that this time the flask was charged with:
194.2 g of isophthalic acid
16.1 g of 5-(sodium sulpho)isophthalic acid
579.1 g of 2,2-dimethyl-1,3-propane diol
321.6 g of 1,1,1-trimethylol propane
20.0 g of demineralised water
0.25 g of Fascat 4100

After a clear reaction mixture had been obtained, there were added:
194.2 g of isophthalic acid and
597.9 g of sebacic acid.

After this reaction mixture became clear, the following components were added:
185.9 g of isophthalic acid and
168.0 g of methoxy polyethylene oxide glycol (Mn=750).

The end product had an acid number of 8.4 mg KOH/g, a practical OH-value of 150 mg KOH/g, an OH-functionality of 3.5, and a Mn of 1,875.

Example 8a

Example 1a was repeated, with the proviso that the flask was charged with:
500 g of the polyester resin of Example 8, after which there were added 2.7 g of N,N-dimethyl ethanol amine and 497.3 g of demineralised water.

The properties of the thus obtained water borne polyester resin dispersion are given in Table 1.

Example 9

In a manner analogous to that disclosed in Example 7, a polyester resin was prepared, with the proviso that this time the flask was charged with:
269.9 g of isophthalic acid
17.1 g of 5-(sodium sulpho)isophthalic acid
376.7 g of 2,2-dimethyl-1,3-propane diol
504.5 g of 1,1,1-trimethylol propane
25.0 g of demineralised water
0.25 g of Fascat 4100

After a clear reaction mixture had been obtained, there were added:
269.8 g of isophthalic acid
348.4 g of sebacic acid
237.0 g of isononanoic acid.

After this reaction mixture became clear, the following components were added:
174.3 g of isophthalic acid and
180.0 g of methoxy polyethylene oxide glycol (Mn=750).

The end product had an acid number of 6.7 mg KOH/g, a practical OH-value of 134 mg KOH/g, an OH-functionality of 3.25, and a Mn of 1,548.

Example 9a

Example 1a was repeated, with the proviso that the flask was charged with:
500 g of the polyester resin of Example 9, after which there were added 2.13 g of N,N-dimethyl ethanol amine and 459.4 g of demineralised water.

The properties of the thus obtained water borne polyester resin dispersion are given in Table 1.

Example 10

In a manner analogous to that disclosed in Example 7, a polyester resin was prepared, with the proviso that this time the flask was charged with:
219.1 g of isophthalic acid
21.4 g of 5-(sodium sulpho)isophthalic acid 426.2 g of 1,4-cyclohexane dimethylol
253.4 g of 2,2-dimethyl-1,3-propane diol
321.6 g of 1,1,1-trimethylol propane
25.0 g of demineralised water
0.25 g of Fascat 4100

After a clear reaction mixture had been obtained, there were added:
219.1 g of isophthalic acid and
533.3 g of sebacic acid.

After this reaction mixture became clear, the following components were added:
172.6 g of isophthalic acid and
180.0 g of methoxy polyethylene oxide glycol (Mn=750).

The end product had an acid number of 6.5 mg KOH/g, a practical OH-value of 145 mg KOH/g, an OH-functionality of 3.25, and a Mn of 1,817.

Example 10a

Example 1a was repeated, with the proviso that the flask was charged with:
500 g of the polyester resin of Example 10, after which there were added 1.55 g of N,N-dimethyl ethanol amine and 478.8 g of demineralised water.

The properties of the thus obtained water borne polyester resin dispersion are given in Table 1.

Example 11

In a manner analogous to that disclosed in Example 7, a polyester resin was prepared, with the proviso that this time a 2 l flask was charged with:
145.7 g of isophthalic acid
13.0 g of 5-(sodium sulpho)isophthalic acid
266.4 g of 1,4-cyclohexane dimethylol
152.3 g of 2,2-dimethyl-1,3-propane diol
201.0 g of 1,1,1-trimethylol propane
35.0 g of demineralised water
0.70 g of Fascat 4100

After a clear reaction mixture had been obtained, there were added:
145.7 g of isophthalic acid and
266.3 g of sebacic acid.

After this reaction mixture became clear, the following components were added:
145.7 g of isophthalic acid and
111.0 g of methoxy polyethylene oxide glycol (Mn=1,000).

The end product had an acid number of 8.0 mg KOH/g, a practical OH-value of 146 mg KOH/g, an OH-functionality of 3.5, and a Mn of 1,773.

Example 11a

Example 1a was repeated, with the proviso that a 1 l flask was charged with:
250 g of the polyester resin of Example 11, after which there were added 1.0 g of N,N-dimethyl ethanol amine and 196.4 g of demineralised water.

The properties of the thus obtained water borne polyester resin dispersion are given in Table 1.

Example 12

In a manner analogous to that disclosed in Example 7, a polyester resin was prepared, with the proviso that this time a 2 l flask was charged with:
160.3 g of isophthalic acid
13.0 g of 5-(sodium sulpho)isophthalic acid
266.4 g of 1,4-cyclohexane dimethylol
152.3 g of 2,2-dimethyl-1,3-propane diol
201.0 g of 1,1,1-trimethylol propane
35.0 g of demineralised water
0.70 g of Fascat 4100

After a clear reaction mixture had been obtained, there were added:
160.3 g of isophthalic acid and
212.9 g of sebacic acid.

After this reaction mixture became clear, the following components were added:
160.3 g of isophthalic acid and
109.0 g of methoxy polyethylene oxide glycol (Mn=1,000).

The end product had an acid number of 8.0 mg KOH/g, a practical OH-value of 147 mg KOH/g, an OH-functionality of 3.5, and a Mn of 1,767.

Example 12a

Example 1a was repeated, with the proviso that a 1 l flask was charged with:
250 g of the polyester resin of Example 12, after which there were added 1.0 g of N,N-dimethyl ethanol amine and 196.4 g of demineralised water.

The properties of the thus obtained water borne polyester resin dispersion are given in Table 1.

Example 13

In a manner analogous to that disclosed in Example 7, a polyester resin was prepared, with the proviso that this time a 2 l flask was charged with:
171.0 g of isophthalic acid
13.0 g of 5-(sodium sulpho)isophthalic acid
266.4 g of 1,4-cyclohexane dimethylol
150.8 g of 2,2-dimethyl-1,3-propane diol
201.0 g of 1,1,1-trimethylol propane
35.0 g of demineralised water
0.70 g of Fascat 4100

After a clear reaction mixture had been obtained, there were added:
169.6 g of isophthalic acid and
177.6 g of sebacic acid.

After a clear reaction mixture had been obtained, there were added:
169.6 g of isophthalic acid and
109.0 g of methoxy polyethylene oxide glycol (Mn=1,000).

The end product had an acid number of 5.1 mg KOH/g, a practical OH-value of 144 mg KOH/g, an OH-functionality of, and a Mn of 1908.

Example 13a

Example 1a was repeated, with the proviso that a 1 l flask was charged with:
250 g of the polyester resin of Example 13, after which there were added 0.6 g of N,N-dimethyl ethanol amine and 250 g of demineralised water.

The properties of the thus obtained water borne polyester resin dispersion are given in Table 1.

Example 14

In a manner analogous to that disclosed in Example 7, a polyester resin was prepared, with the proviso that this time a 6 l flask was charged with:
385.1 g of isophthalic acid
42.9 g of 5-(sodium sulpho)isophthalic acid 852.5 g of 1,4-cyclohexane dimethylol
1265 g of 1,1,1-trimethylol propane
50.0 g of demineralised water
0.50 g of Fascat 4100

After a clear reaction mixture had been obtained, there were added:

385.1 g of isophthalic acid and
1195.8 g of sebacic acid.

After this reaction mixture became clear, the following components were added:

345.3 g of isophthalic acid and
360.0 g of methoxy polyethylene oxide glycol (Mn=750).

The end product had an acid number of 6.4 mg KOH/g, a practical OH-value of 199 mg KOH/g, an OH-functionality of 4.9, and a Mn of 1,771.

Example 14a

Example 1a was repeated, with the proviso that the 2 l flask was charged with:

500 g of the polyester resin of Example 14, after which there were added 1.5 g of N,N-dimethyl ethanol amine and 425.9 g of demineralised water.

The properties of the thus obtained water borne polyester resin dispersion are given in Table 1.

Example 15

In a manner analogous to that disclosed in Example 7, a polyester resin was prepared, with the proviso that this time a 2 l flask was charged with:

145.7 g of isophthalic acid
13.4 g of 5-(sodium sulpho)isophthalic acid
266.4 g of 1,4-cyclohexane dimethylol
395.3 g of 1,1,1-trimethylol propane
35.0 g of demineralised water
0.70 g of Fascat 4100

After a clear reaction mixture had been obtained, there were added:

145.7 g of isophthalic acid and
266.3 g of sebacic acid.

After this mixture became clear, the following components were added:

145.7 g of isophthalic acid and
114.0 g of methoxy polyethylene oxide glycol (Mn=1,000).

The end product had an acid number of 6.4 mg KOH/g, a practical OH-value of 200 mg KOH/g, an OH-functionality of 5.1, and a Mn of 1,801.

Example 15a

Example 1a was repeated, with the proviso that the flask was charged with:

250 g of the polyester resin of Example 15, after which there were added 0.8 g of N,N-dimethyl ethanol amine and 221.7 g of demineralised water.

The properties of the thus obtained water borne polyester resin dispersion are given in Table 1.

Example 16

In a manner analogous to that disclosed in Example 7, a polyester resin was prepared, with the proviso that this time the 2 l flask was charged with:

171.0 g of isophthalic acid
13.4 g of 5-(sodium sulpho)isophthalic acid
266.4 g of 1,4-cyclohexane dimethylol
395.3 g of 1,1,1-trimethylol propane
35.0 g of demineralised water
0.70 g of Fascat 4100

After a clear reaction mixture had been obtained, there were added:

169.6 g of isophthalic acid and
177.6 g of sebacic acid.

After this reaction mixture became clear, the following components were added:

169.6 g of isophthalic acid and
112.5 g of methoxy polyethylene oxide glycol (Mn=1,000).

The end product had an acid number of 7.9 mg KOH/g, a practical OH-value of 204 mg KOH/g, an OH-functionality of 5.1, and a Mn of 1,893.

Example 16a

Example 1a was repeated, with the proviso that the flask was charged with:

250 g of the polyester resin of Example 16, after which there were added 0.9 g of N,N-dimethyl ethanol amine and 270.8 g of demineralised water.

The properties of the thus obtained polyester resin dispersion are given in Table 1.

TABLE 1

| PE dispersion from example | polyester resin | | | | | | dispersion | | | | |
| --- | --- | --- | --- | --- | --- | --- | --- | --- | --- | --- | --- |
| | OH number Mg KOH/g | COOH number mg KOH/g | SO$_3$Na number mg KOH/g | Mn | average OH Functionality | wt. % non-ionic | N.R. COOH % | pH | average particle size (nm) | viscosity (Pa.sec) | wt. % solids |
| 1a | 139 | 14.9 | — | 1376 | 3 | 8.6 | 80 | 7.9 | 81 | 1.64 | 53.0 |
| 1b | 139 | 14.9 | — | 1376 | 3 | 8.6 | 75 | 7.6 | 164 | 1.01 | 56.0 |
| 2a | 147 | 13.0 | — | 1487 | 3.25 | 8.5 | 80 | 8.0 | 55 | 1.56 | 51.0 |
| 2b | 147 | 13.0 | — | 1487 | 3.25 | 8.5 | 70 | 7.7 | 160 | 1.48 | 57.0 |
| 3a | 136 | 14.0 | — | 1370 | 3 | 8.6 | 75 | 7.7 | 60 | 1.90 | 51.5 |
| 3b | 136 | 14.0 | — | 1370 | 3 | 8.6 | 65 | 7.5 | 160 | 1.66 | 56.5 |
| 4a | 136 | 13.5 | — | 1381 | 3 | 8.6 | 60 | 7.5 | 156 | 1.72 | 57.0 |
| 5a | 151 | 14.6 | — | 1443 | 3.5 | 8.4 | 70 | 7.7 | 156 | 1.09 | 54.0 |
| 6a | 135 | 13.3 | — | 1352 | 3.5 | 8.5 | 65 | 7.6 | 154 | 1.10 | 55.0 |
| 7a | 144 | 6.7 | 2.1 | 1593 | 3.25 | 8.5 | 60 | 7.8 | 73 | 1.89 | 50.0 |
| 7b | 144 | 6.7 | 2.1 | 1593 | 3.25 | 8.5 | 30 | 7.2 | 136 | 1.75 | 54.0 |

TABLE 1-continued

| PE dispersion from example | polyester resin | | | | | | dispersion | | | | |
|---|---|---|---|---|---|---|---|---|---|---|---|
| | OH number Mg KOH/g | COOH number mg KOH/g | SO$_3$Na number mg KOH/g | Mn | average OH Functionality | wt. % non-ionic | N.R. COOH % | pH | average particle size (nm) | viscosity (Pa.sec) | wt. % solids |
| 8a | 150 | 8.4 | 1.7 | 1875 | 3.5 | 8.4 | 40 | 7.7 | 97 | 1.57 | 50.0 |
| 9a | 134 | 6.7 | 1.7 | 1548 | 3.25 | 8.5 | 40 | 7.4 | 137 | 1.15 | 52.0 |
| 10a | 145 | 6.5 | 2.1 | 1817 | 3.25 | 8.5 | 30 | 7.4 | 110 | 2.24 | 51.0 |
| 11a | 146 | 8.0 | 2.1 | 1773 | 3.5 | 8.5 | 30 | 6.6 | 144 | 0.57 | 56.0 |
| 12a | 147 | 8.0 | 2.1 | 1767 | 3.5 | 8.5 | 30 | 6.8 | 125 | 0.66 | 56.0 |
| 13a | 144 | 5.1 | 2.1 | 1908 | 3.5 | 8.5 | 30 | 7.2 | 94 | 1.02 | 50.0 |
| 14a | 199 | 6.4 | 2.1 | 1771 | 4.9 | 8.2 | 30 | 7.0 | 126 | 0.78 | 54.0 |
| 15a | 200 | 6.4 | 2.1 | 1801 | 5.1 | 8.5 | 30 | 6.6 | 162 | 0.28 | 53.0 |
| 16a | 204 | 7.9 | 2.1 | 1893 | 5.1 | 8.5 | 30 | 7.3 | 93 | 0.19 | 48.0 |

Examples 17 to 48

The aqueous polyester resin dispersions (component A) were mixed with polyfunctional isocyanate cross-linkers (component B) in a ratio NCO:OH=1.5. The polyester resin dispersions were diluted with butyl glycol (10 wt. % on solids).

The isocyanate components were diluted with methoxy isopropyl acetate (80 wt. % on solids).

For the isocyanate cross-linkers use was made of two polyisocyanates, both commercially available from Bayer:

a) Desmodur LS 2025 (a hydrophobic isocyanurate based on 1,6-hexamethylene diisocyanate), and b) Bayhydur LS 2032 (a hydrophilic isocyanurate based on 1,6-hexamethylene diisocyanate, modified with about 12 wt. % of methoxy polyethylene oxide glycol).

No use was made of a catalyst.

The mixtures with LS 2025 according to the invention all had a solids content of more than 50 wt. %, whereas the mixtures with the hydrophilic LS 2032 (comparison) had a maximum achievable solids content of between 40 and 45 wt. %.

The mixtures of polyester resin dispersions and the isocyanate components were applied on glass panels in a dry layer thickness between 60 and 80 μm. The panels were allowed to dry at ambient (room) temperature (RT) for one week.

The Persoz Hardness was determined in accordance with French industrial standard method NF T30-016, the result being expressed in seconds, and is given in Table 2.

The hardness of the coating layers prepared with LS 2025 was much higher than that of those prepared with LS 2032 and displayed excellent water and solvent resistance.

TABLE 2

| Example | PE dispersion A from example | Cross-linker B | Persoz hardness on glass after 1 week |
|---|---|---|---|
| 17 | 1b | LS 2025 | 144 |
| 18 | | LS 2032* | 79 |
| 19 | 2b | LS 2025 | 168 |
| 20 | | LS 2032 | 83 |
| 21 | 3b | LS 2025 | 152 |
| 22 | | LS 2032* | 80 |
| 23 | 4a | LS 2025 | 164 |
| 24 | | LS 2032* | 85 |
| 25 | 5a | LS 2025 | 138 |
| 26 | | LS 2032* | 76 |
| 27 | 6a | LS 2025 | 143 |
| 28 | | LS 2032* | 75 |
| 29 | 7b | LS 2025 | 179 |

TABLE 2-continued

| Example | PE dispersion A from example | Cross-linker B | Persoz hardness on glass after 1 week |
|---|---|---|---|
| 30 | | LS 2032* | 88 |
| 31 | 8a | LS 2025 | 148 |
| 32 | | LS 2032* | 82 |
| 33 | 9a | LS 2025 | 174 |
| 34 | | LS 2032* | 102 |
| 35 | 10a | LS 2025 | 191 |
| 36 | | LS 2032* | 124 |
| 37 | 11a | LS 2025 | 187 |
| 38 | | LS 2032* | 130 |
| 39 | 12a | LS 2025 | 241 |
| 40 | | LS 2032* | 163 |
| 41 | 13a | LS 2025 | 292 |
| 42 | | LS 2032* | 209 |
| 43 | 14a | LS 2025 | 254 |
| 44 | | LS 2032* | 179 |
| 45 | 15a | LS 2025 | 310 |
| 46 | | LS 2032* | 228 |
| 47 | 16a | LS 2025 | 304 |
| 48 | | LS 2032* | 247 |

Note that the coating layers of Examples 11a to 13a (Examples 37 to 42) gained hardness when the ratio of isophthalic acid to sebacic acid was increased. The same applies for the increase in OH functionality.

Examples 49 to 68

Mixtures of the polyester resin dispersions with LS 2025 using 0.1 wt. % of Sn dilaurate as catalyst were diluted to spraying viscosity, sprayed over a water borne metallic base coat (Autowave® ex Akzo Nobel Coatings BV), and allowed to dry at 60° C. for 30 minutes as well as at ambient temperature (RT). The NCO:OH ratio was 1.5.

After one day the D.O.I. (distinction of image) and the gloss were measured in accordance with ASTM D-523 at 20° and 60°. A D.O.I. of between 60 and 80 is acceptable, whereas a gloss value on a base coat at 20° of above 80 is considered high, while a gloss value at 60° of above 90 is considered very high. The results are given in Table 3.

TABLE 3

Clear coats on metallic base coat

| Ex. | PE dispersion from example | Curing temp. °C. | Layer thickness μm | D.O.I. Angle Units | Gloss 20° Gloss Units | Gloss 60° Gloss Units |
|---|---|---|---|---|---|---|
| 49 | 1b | RT | 58 | 50 | 83 | 93 |
| 50 | | 60 | 60 | 78 | 88 | 94 |
| 51 | 2b | RT | 61 | 62 | 85 | 93 |
| 52 | | 60 | 65 | 74 | 89 | 94 |
| 53 | 3b | RT | 71 | 79 | 89 | 91 |
| 54 | | 60 | 80 | 64 | 81 | 88 |
| 55 | 4a | RT | 57 | 79 | 90 | 89 |
| 56 | | 60 | 56 | 73 | 91 | 92 |
| 57 | 5a | RT | 60 | 68 | 86 | 92 |
| 58 | | 60 | 62 | 60 | 87 | 93 |
| 59 | 6a | RT | 58 | 81 | 89 | 93 |
| 60 | | 60 | 53 | 58 | 82 | 87 |
| 61 | 7b | RT | 57 | 79 | 91 | 92 |
| 62 | | 60 | 56 | 73 | 87 | 92 |
| 63 | 8a | RT | 65 | 78 | 87 | 93 |
| 64 | | 60 | 67 | 80 | 87 | 93 |
| 65 | 9a | RT | 63 | 81 | 88 | 92 |
| 66 | | 60 | 63 | 77 | 87 | 93 |
| 67 | 10a | RT | 55 | 68 | 88 | 93 |
| 68 | | 60 | 53 | 62 | 82 | 92 |

Examples 69 to 74

The aqueous polyester resin dispersions (component A) were mixed with polyfunctional isocyanate cross-linkers (component B) in a ratio NCO:OH=1.5 using 0.1 wt. % of Sn dilaurate as catalyst. The aqueous coating composition was diluted with methoxy isopropyl acetate to obtain a VOC of 250 g/l.

For the isocyanate cross-linkers use was made of four polyisocyanates, all commercially available from Bayer:

a) Desmodur LS 2025 (a hydrophobic isocyanurate based on 1,6-hexamethylene diisocyanate),
b) Desmodur LS 2550 (a hydrophobic uretdione based on 1,6-hexamethylene diisocyanate),
c) Bayhydur LS 2032 (a hydrophilic isocyanurate based on 1,6-hexamethylene diisocyanate, modified with about 12 wt. % of methoxy polyethylene oxide glycol), and
d) Desmodur LS 2150 (a hydrophilic isocyanurate based on isophorone diisocyanate, modified with about 9 wt. % of methoxy polyethylene oxide glycol).

The mixtures of polyester resin dispersions and the isocyanate components were applied on steel panels. The panels were allowed to dry at ambient (room) temperature (RT) for one week. The Persoz Hardness was determined in accordance with French industrial standard method NF T30-016, the result being expressed in seconds, and is given in Table 4.

TABLE 4

| Example | PE dispersion from example | Cross-linker B* | Layer thickness (μm) | Persoz hardness |
|---|---|---|---|---|
| 69 | 7a | LS 2032/LS 2150 | 48 | 100 |
| 70 | | LS 2025/LS 2150 | 38 | 186 |
| 71 | | LS 2025/LS 2032 | 33 | 85 |
| 72 | | LS 2025/LS 2032/LS 2150 | 49 | 127 |
| 73 | 14a | LS 2025/LS 2032/LS 2150 | 50 | 283 |
| 74 | | LS 2550/LS 2032/LS 2150 | 46 | 225 |

*amount of polyisocyanate is 1/1 or 1/1/1 based on NCO functionality

Examples 75 to 80

The aqueous polyester resin dispersions (component A) were mixed with poly-functional isocyanate cross-linkers (component B) in a ratio NCO:OH=1.5 using 0.1 wt. % of Sn dilaurate as catalyst. The aqueous coating composition was diluted with methoxy isopropyl acetate to obtain a VOC of 250 g/l.

The aqueous coating compositions were sprayed over a water borne metallic base coat (Autowave® ex Akzo Nobel Coatings BV) and allowed to dry at 60° C. for 30 minutes. After one day the D.O.I. (distinction of image) and the gloss were measured in accordance with ASTM D-523 at 20° and 60°. The results are given in Table 5.

TABLE 5

| Ex. | PE dispersion A from example | Cross-linker B* | Layer Thickness clear coat μm | D.O.I. Angle Units | Gloss 20° Gloss Units | Gloss 60° Gloss Units |
|---|---|---|---|---|---|---|
| 75 | 7a | LS 2032/LS 2150 | 48 | 84 | 86 | 94 |
| 76 | | LS 2025/LS 2150 | 38 | 79 | 94 | 93 |
| 77 | | LS 2025/LS 2032 | 33 | 67 | 86 | 95 |
| 78 | | LS 2025/ LS 2032/LS 2150 | 32 | 68 | 87 | 94 |
| 79 | 14a | LS 2025/ LS 2032/LS 2150 | 50 | 86 | 88 | 93 |
| 80 | | LS 2550/ LS 2032/LS 2150 | 46 | 84 | 88 | 95 |

Comparison Example I

Example 1 was repeated, except that 597.6 g of sebacic acid were replaced by 431.9 g of adipic acid.

The polyester resin had an acid value of 15.2 mg KOH/g and a practical OH value of 150.0 mg KOH/g.

Comparison Example Ia

Example 1a was repeated, except that the flask was filled with 500 g of the polyester resin of Comparison Example I, instead of 500 g of the polyester resin of Example 1, after which there were added 9.6 g of N,N-dimethyl ethanol amine and 490.4 g of demineralised water.

The polyester resin dispersion had the following properties:

pH=7.7, particle size (nm)=72, wt % solids: 50.0.

Comparison Example II

Example 1 was repeated, except that 398.6 g of isophthalic acid were replaced by 355.4 g of phthalic anhydride.

The polyester resin had an acid value of 16.0 mg KOH/g and a practical OH value of 138 mg KOH/g.

Comparison Example IIa

Example 1a was repeated, except that the flask was filled with 500 g of the polyester resin of Comparison Example II, instead of 500 g of the polyester resin of Example 1, after which there were added 10.2 g of N, N-dimethyl ethanol amine and 415.7 g of demineralised water.

The polyester resin dispersion had the following properties:

pH=7,8, particle size=97 nm, wt. % solids: 54.

The water borne polyester resin dispersions of Example 1a, Comparison Example Ia, Comparison Example IIa, and Example 7b were submitted to a stability test in an oven at 35° C. The dispersions were about 3 weeks old at the start. The results are given in Table 6.

TABLE 6

| Polyester resin Dispersion | | pH | | | | |
|---|---|---|---|---|---|---|
| Ex. | of Example | At Start | After 3 months | After 6 months | After 9 months | After 12 months |
| 81 | 1a | 7.7 | 7.5 | 7.3 | 6.8 | 6.6 |
| A | Ia | 7.5 | 6.2 | 5.7 course | Phase separation | |
| B | IIa | 7.6 | 6.0 | Phase separation | | |
| 82 | 7b | 7.2 | 6.5 | 6.2 | 6.0 | 5.6 |

The polyester resin dispersions according to the invention (Examples 81 and 82) are good to use after one year of storage at 35° C. and give about the same coatings properties as freshly prepared dispersions. The polyester resin dispersions prepared according to the Comparison Examples (A and B) are no longer useful after 6 months of storage at 35° C.

We claim:

1. A branched hydroxyl-functional polyester resin having an average hydroxyl functionality of >2, a hydroxyl number of 25 to 300 mg KOH/g, and a number average molecular weight within the range of from 500 to 3,000, which polyester resin comprises polyalkylene oxide groups and, optionally, sulphonate groups, wherein the polyester resin comprises the reaction product of 1) a mixture of carboxylic acids comprising
   50 to 80 mole % of an m- and/or p-aromatic and/or cycloaliphatic dicarboxylic acid,
   20 to 50 mole % of an aliphatic dicarboxylic acid and/or aliphatic monocarboxylic acid with more than 6 carbon atoms, and, optionally, a tri- or higher-functional acid, and 2) a mixture of alcohols comprising
   an aliphatic diol with at least 4 carbon atoms and/or a cycloaliphatic diol with at least 4 carbon atoms, a $C_1$–$C_4$ alkoxy polyalkylene oxide glycol and/or $C_1$–$C_4$ alkoxy polyalkylene oxide 1,3-diol having a number average molecular weight of 500 to 3,000, and, optionally, a tri- or higher-functional polyalcohol, wherein the polyester resin has a carboxylic acid number of $\leq 20$ mg KOH/g ($\leq 0.357$ meq COOH groups per g of resin) and, optionally, a sulphonate number of $\leq 4$ mg KOH/g ($\leq 0.070$ meq sulphonate groups per g of resin), the acid groups being at least partly neutralised.

2. A branched hydroxyl-functional polyester resin according to claim 1, wherein the tri- or higher-functional acid is selected from the group of trimellitic acid and pyromellitic acid or the anhydride thereof.

3. A branched hydroxyl-functional polyester resin according to claim 1, wherein the tri- or higher-functional polyalcohol is selected from the group of 1,1,1-trimethylol propane, 1,1,1-trimethylol ethane, 1,2,3-trimethylol propane, and pentaerythritol.

4. A branched hydroxyl-functional polyester resin according to claim 1, wherein the amount of $C_1$–$C_4$ alkoxy polyalkylene oxide groups in the polyester resin is in the range of 2.5 to 15 wt. %.

5. A branched hydroxyl-functional polyester resin according to claim 4, wherein the amount of $C_1$–$C_4$ alkoxy polyalkylene oxide groups in the polyester resin is in the range of 5 to 10 wt. %.

6. An aqueous dispersion of a branched hydroxyl-functional polyester resin according to claim 1, wherein the concentration of polyester resin particles with an average particle size of 30 to 300 nm is 45 to 65 wt. % at a viscosity up to 5 Pa·s.

7. An aqueous cross-linkable binder composition comprising
   A) at least one branched hydroxyl-functional polyester resin according to claim 1, and
   B) at least one organic hydrophobic polyisocyanate.

8. An aqueous cross-linkable binder composition according to claim 7, wherein the NCO:OH equivalent ratio, based on the isocyanate groups of component (B) and the hydroxyl groups of component (A), is within the range of from 0.5:1 to 3:1.

9. An aqueous cross-linkable binder composition according to claim 7, wherein the isocyanate groups of component (B) are free isocyanate groups.

10. An aqueous cross-linkable binder composition according to claim 7, wherein said composition includes another polymer or polymer dispersion.

11. An aqueous cross-linkable binder composition according to claim 7, wherein said composition includes a reactive diluent.

12. A method of using the aqueous cross-linkable binder compositions according to claim 7 as binders for lacquers, coatings or sealing compounds.

13. Aqueous coating composition comprising the aqueous cross-linkable binder composition according to claim 7.

14. A method of using the aqueous coating composition according to claim 13 in car refinish applications.

* * * * *